(12) United States Patent
Sundquist

(10) Patent No.: US 6,675,014 B1
(45) Date of Patent: Jan. 6, 2004

(54) APPARATUS, AND ASSOCIATED METHOD, FOR UPDATING A LOCATION REGISTER IN A MOBILE, PACKET RADIO COMMUNICATION SYSTEM

(75) Inventor: Jaakko Sundquist, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/418,876

(22) Filed: Oct. 15, 1999

(51) Int. Cl.[7] .................................................. H04Q 7/20
(52) U.S. Cl. ................... 455/435.1; 455/456.1; 455/432.1; 455/432.3; 455/422.1
(58) Field of Search ............................ 455/435, 436, 455/437, 438, 439, 432, 421, 422, 456, 456.1, 435.1, 432.1, 432.3, 422.1; 370/331, 310, 310.2, 328, 329

(56) References Cited

U.S. PATENT DOCUMENTS

| | | | | |
|---|---|---|---|---|
| 5,548,586 A | * | 8/1996 | Kito et al. ................... 370/349 |
| 5,642,398 A | * | 6/1997 | Tiedemann et al. ......... 455/426 |
| 5,889,770 A | * | 3/1999 | Jokiaho et al. ............. 370/337 |
| 6,018,573 A | * | 1/2000 | Tanaka ....................... 455/422 |
| 6,081,723 A | * | 6/2000 | Mademann .................. 370/338 |
| 6,137,791 A | * | 10/2000 | Frid et al. .................... 370/331 |
| 6,233,035 B1 | * | 5/2001 | Toshiyuki et al. ............ 348/54 |
| 6,330,454 B1 | * | 12/2001 | Verdonk ...................... 455/404 |

OTHER PUBLICATIONS

Liao W: "Mobile Internet Telephony: Mobile Extensions to H.323", New York, NY, Mar. 21–25, NY: IEEE, US, Mar. 21, 1999, pp. 12–19.

* cited by examiner

Primary Examiner—Edward F. Urban
Assistant Examiner—Sonny Trinh

(57) ABSTRACT

Apparatus, and an associated method, for updating a location register with an updated position of a mobile station operable in an H.323-based, radio communication system. RAS-protocol (registration, admissions, status-protocol) messages are generated in a H.323 network to effectuate the updating of the location register.

19 Claims, 6 Drawing Sheets

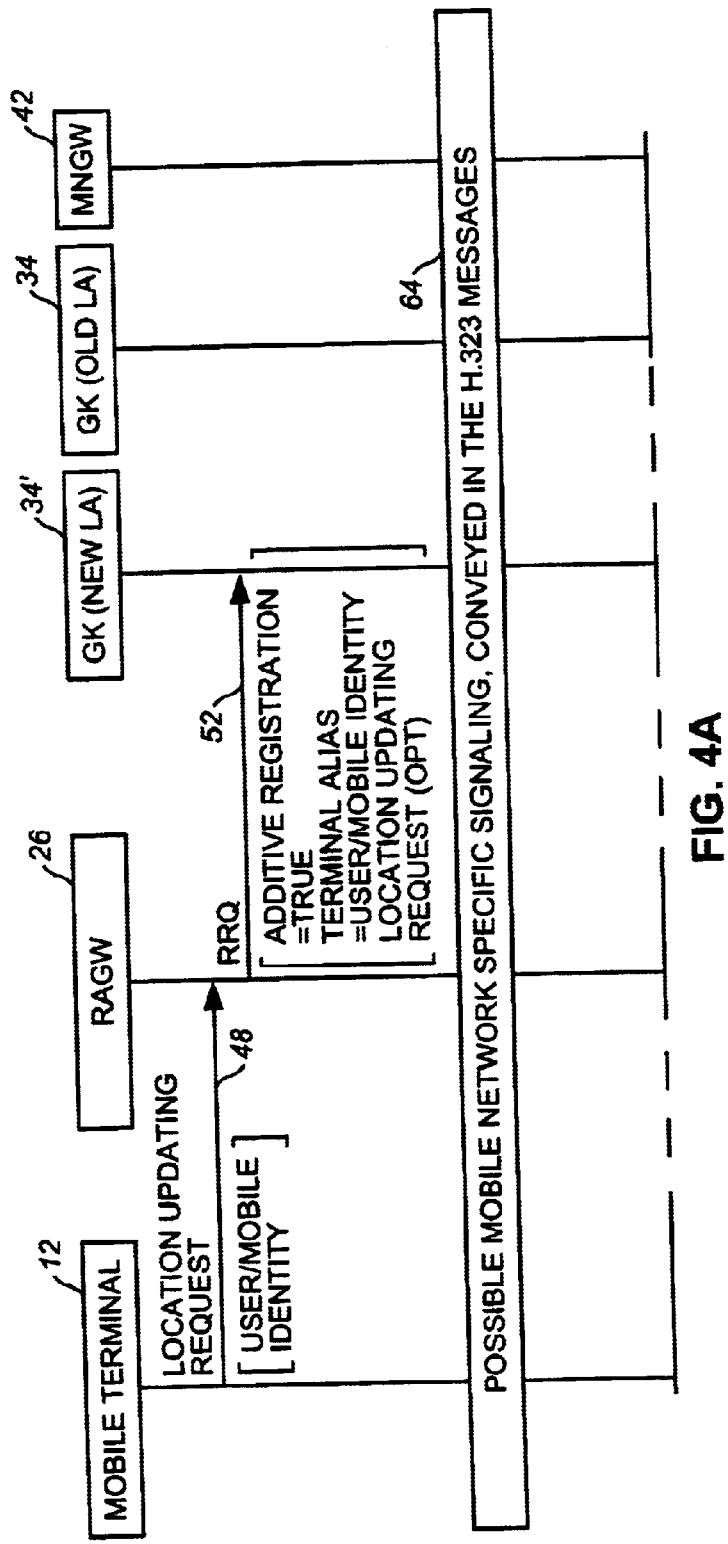

APPARATUS, AND ASSOCIATED METHOD, FOR UPDATING A LOCATION REGISTER IN A MOBILE, PACKET RADIO COMMUNICATION SYSTEM

The present invention relates generally to the communication of real time media, such as media data formatted pursuant to RTP (real-time transmission protocol), such as H.323, in a mobile, packet radio communication system. More particularly, the present invention relates to apparatus, and an associated method, by which to update a location register with an updated position of a mobile station operable in the communication system. Operation of an embodiment of the present invention provides a manner by which to maintain an accurate registry of position information of mobile stations operable to communicate RTP data in the mobile, packet radio communication system.

BACKGROUND OF THE INVENTION

Advancements in communication technologies have permitted the introduction of, and popularization of, new types of, and improvements in existing, communication systems. Increasingly large amounts of data are permitted to be communicated at increasing throughput rates through the use of such new, or improved, communication systems. As a result of such improvements, new types of communications, requiring high data throughput rates, are possible. Digital communication techniques, for instance, are increasingly utilized in communication systems to efficiently communicate digital data, and the use of such techniques has facilitated the increase data throughput rates.

When digital communication techniques are used, information which is to be communicated is digitized. In one technique, the digitized information is formatted into packets, or frames, and, once formatted, the data is communicated upon a communication channel, thereby to be transmitted to a destination. Individual ones, or groups, of the packets or frames of data can be communicated at discrete intervals, and once communicated concatenated together to recreate the informational content contained therein.

Because data formatted in this manner can be communicated at the discrete intervals, a communication channel need not be dedicated solely for the communication of data generated by one sending station to one receiving station, as conventionally required in circuit-switched communications. Instead, a single channel can be shared amongst a plurality of different sending and receiving station-pairs. Because a single channel can be utilized to effectuate communications by the plurality of pairs of communication stations, improved communication capacity is possible.

Also through the use of digital communication techniques, any of a large number of different types of data can be communicated. And, more than one type of data can be communicated in a multi-media application. Different types of data exhibit different communication requirements however. For instance, voice data must be communicated in real time. That is to say, voice data must be communicated without significant delay and must be communicated in a manner which permits its reconstruction at a receiving station in a manner which introduces minimal time distortion. Otherwise, the voice data shall appear to be noticeably distorted.

Internet telephony is exemplary of communications which can be effectuated utilizing digital communication techniques. With the popularization of the Internet and communication thereon, standardized protocols have been set forth by which to communicate information in a form amenable to its transmission by way of the Internet. An example protocol is H.323. H.323 is a widely used ITU standard which uses RTP (real-time transmission protocol).

According to the H.323 protocol, when data is to be transmitted by a sending station, logical channels upon which to transmit the data are assigned. The data channels are allocated responsive to requests made by the sending station. Separate logical channels are requested for separate types of data. For instance, a first logical channel is requested upon which to transmit voice data, and allocation of a second logical channel is requested for transmission of non-voice data. A subset of the H.323 protocol, referred to as the H.245 protocol, defines the manner in which the channels are requested. Data is thereafter transmitted upon the logical channels. In conventional manner, individual packets, or frames, include header information, such as IP, UDP, and RTP information, to identify to where the packet is to be directed and to provide a time stamp with the packet. The informational content, referred to as the payload, is appended to the header information.

The H.323 protocol was intended originally for wireline communications, such as between communication stations, connected by wireline connections including those of the Internet. But, advancements in communication technologies have also permitted the widespread usage of radio communication systems. A cellular communication system is exemplary of a wireless communication system which has achieved wide levels of popularity and usage. Telephonic communication by way of a cellular communication system mimics communication by way of a conventional, wireline, telephonic system. However, difficulties arise when packet or frame-formatted data, such as that formatted pursuant to the H.323, or other RTP, protocol is communicated by way of a cellular communication system.

For instance, standards related to the H.323 protocol do not provide manners for implementing mobility for mobile stations operable in an H.323-based communication system. Maintenance of a location register with updated positional information related to the position of mobile stations is required in order to efficiently route data frames between sending and receiving stations operable pursuant to a communication session in the H.323-based system.

A manner by which to provide for updating of a location register in an H.323-based, or other RTP-type, radio communication system would therefore be advantageous.

It is in light of this background information related to radio communications that the significant improvements of the present invention have evolved.

SUMMARY OF THE INVENTION

The present invention, accordingly, advantageously provides apparatus, and an associated method, for updating a location register of an H.323-based, or other RTP-based, radio communication system.

In operation of an embodiment of the present invention, a location register is accessible by a gatekeeper defined in the network of the RTP-based system. When a mobile station operable in the system crosses a boundary separating location areas, an indication of such crossing is provided to the gatekeeper. The indication is provided to the gatekeeper pursuant to a request to update the contents of the location register with updated positioning information pertaining to the position of the mobile station, If the request is granted, the updated position of the mobile station is registered at the location register, and the prior-registered position of the mobile station is removed from the location register. Requests to update the registered position of the mobile station are also made upon powering-up of the mobile station and at timed intervals, timed, for instance, by the mobile station.

In one implementation, an embodiment of the present invention is operable in an H.323 based system in which mobile stations are operable to communicate H.323-formatted data, such as pursuant to an Internet telephony application. The packet network of the H.323-based system includes radio access gateways (RAGWs). Each RAGW is formed of a base transceiver station (BTS) and a gateway part extending to an H.323 system. Because of the mobility provided to the mobile station, the mobile station might travel such that hand-over of communications are effectuated from one RAGW to another RAGW. And, the mobile terminal might travel to be repositioned when in an inactive state, also to be associated with another RAGW. If the first radio gateway, referred to as the source radio gateway, is part of a different location area (LA) than that with which the second radio gateway, referred to as the target gateway, the new position of the mobile station is updated, through operation of an embodiment of the present invention at a location register. Registration of the updated position of the mobile station is performed by an additive registration process.

In one aspect of the present invention, a gatekeeper is associated with the H.323 network. A mobile station initiates the location updating procedure by generating a location update request. The request is generated, for instance, when the mobile station is repositioned from one location area to another location area. And, the request is also generated during initial powering-up of the mobile station as well as at timed intervals. The request is transmitted upon a ratio link formed between the mobile station and a radio gateway. The receiving radio gateway, in turn, generates a RAS-protocol (registration, admissions, status-protocol) message which is routed through the H.323 network to the gatekeeper. A determination is made at the gatekeeper whether to update the location register. If a determination is made that the location register should be updated, the register is updated with the updated position of the mobile station, and a prior-stored position of the mobile station is removed from the location register. Another RAS-protocol message is returned by the gatekeeper to the radio gateway to confirm the updating of the location register. And, in turn, the radio gateway transmits a location update accept message back to the mobile station.

The mobile station might also be repositioned at a target radio gateway which is associated with a gatekeeper other than the gatekeeper with which the source radio gateway is associated. Again, the mobile station generates a location update request which is transmitted over a radio link to the target radio gateway. And, the target radio gateway generates an RAS-protocol message which is routed through the H.323 network to the gatekeeper associated with the target radio gateway. A determination is made at the gatekeeper whether to update the location register. If a determination is made to update the location register, the updated position of the mobile station is stored there at and a confirmation message, again an RAS-protocol message, is returned to the target radio gateway. Also, because the prior-stored position of the mobile station is stored at a gatekeeper other than the gatekeeper at which the updated position is stored, the gatekeeper associated with the prior-stored position is informed of the new registration at allocation register associated with the second gatekeeper.

Through operation of an embodiment of the present invention, therefore, a manner is provided by which to provide for mobility in an H.323-based, or other RTP-based, communication system. A manner is provided by which to update a location register with an updated position of the mobile station, such as when the mobile station travels between location areas defined in the communication system.

In these and other aspects, therefore, apparatus, and an associated method, is provided for updating a location register with an updated position of a mobile station operable in a packet radio communication system. The packet radio communication system defines a first location area formed of a first set of cells and at least a second location area formed of at least a second set of cells. The first and at least second location areas are separated by a location boundary. A determination is made of when the updated position of the mobile station should be updated at the location register. A request to update the location register with the updated position of the mobile terminal is generated when a determination is made that the location register should be updated with the updated position. If the request to update the location register is accepted, the location register is updated with the updated position of the mobile station. And, the updating of the location register with the updated position is thereafter confirmed.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION OF THE PREFERRED EMBODIMENT

Figure 1:
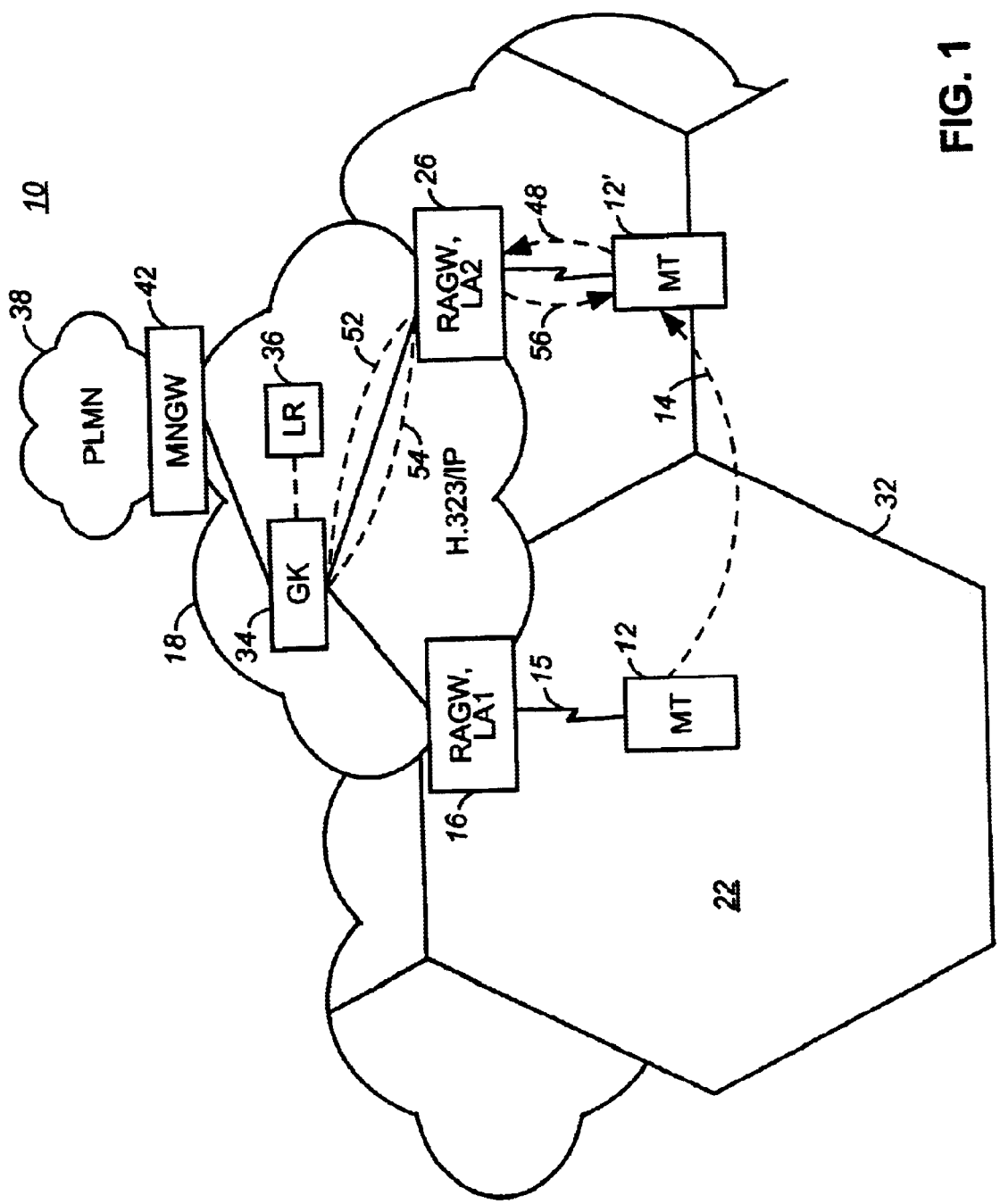
FIG. 1 illustrates a functional block diagram of a communication system in which an embodiment of the present invention is operable.

Referring first to FIG. 1, a communication system, shown generally at 10, provides for the communication of frame-formatted data, here H.323-formatted data with mobile stations, of which the mobile station 12 is exemplary. The communication system includes a radio part and a wireline part, each capable of communicating frame-formatted data. In the exemplary implementation, the radio part of the radio communication system is formed of a GSM (global system for mobile communications) communication system, and the wireline portion includes an internet network. In other implementations, the radio and wireline parts of the communication system are formed of a structure defined by other systems, and embodiments of the present invention are analogously operable therein.

The mobile station 12, as well as other mobile stations operable in the communication system, is formed of, for example, a cellular terminal operable in the aforementioned GSM system, together with a laptop computer, or the like, which generates H.323-formatted data. Internet telephony is exemplary of an application in which the mobile station is utilized during operation of an embodiment of the present invention. The mobile station 12 is capable of movement, such as travel in the direction indicated by the arrow 14 to be positioned at a subsequent time at a subsequent position, here indicated at 12'.

The mobile station is operable to communicate by way of a radio-link 14, having both uplink and downlink channels defined thereon. Communications are effectuated between the mobile station and a radio gateway (RAGW) 16. While not separately shown, the radio gateway 16 is formed of a base transceiver station and a gateway to the network portion here an H.323 network 18.

In conventional manner, the base transceiver station of the radio gateway defines a cell; here, the radio gateway 16 defines a cell 22. Groups of radio gateways, and associated cells together define a location area. The cell 22 is a cell here shown to form a portion of a first location area (LA1). And, while not shown in the figure, one RAGW can handle multiple cells.

The communication system 10 is further shown to include an additional radio gateway 26. While also not separately shown, the radio gateway 26 is also formed of a base transceiver station and other network infrastructure of the radio part of the communication system and a gateway to the H.323 network 18. The radio gateway 26 also defines a cell, here cell 28. Groups of radio gateways and cells associated therewith form location areas. Here, the cell 28 associated with the radio gateway 26 forms a portion of a second location area (LA2). A location area boundary 32 extends between the cells 22 and 28. When the mobile terminal 12 travels in the direction of the arrow 14, subsequently to be positioned at 12', the mobile terminal passes from the first location area to the second location area.

In the illustration of the Figure, a gatekeeper 34 is associated with both the radio gateways 16 and 26. And, the gatekeeper 34 has access to a location register 36. The location register, may, for instance, be embodied at the gatekeeper 34. The location register maintains a registry of positions at which mobile terminals operable by way of the network 18 are located. Accurate position information located at the location register facilitates communication in the communication system.

Operation of an embodiment of the present invention provides a manner by which to facilitate updating of the location register with positional information of the mobile station. By providing the location register with updated positional information of the mobile station, efficiency of communication in the communication system is facilitated.

The H.323 network 18 is also shown to be coupled to a PLMN (public land mobile network) 38 by way of a mobile network gateway (MNGW) 42. The mobile network gateway 42 is also associated with the gatekeeper 34.

During operation, prior to communication through one of the gateways 16, 26, or 42, registration is made by the respective gateway to the gatekeeper of the respective ones of the gateways. During initial registration, normal registration processes are utilized and the endpoints, i.e., communication stations, such as mobile station 12, inform the gatekeeper 34 regarding various aspects of the endpoint's operation, such as their respective signaling transport addresses. RAS (registration, admissions, status-protocol) and Q.931 are exemplary of signaling transport addresses.

The mobile station 12 initiates a request to update the contents of the location register, such as when the mobile station crosses the location boundary 32 to be positioned at the cell 28, as indicated by 12'. A location update request, indicated by the line 48, is transmitted by the mobile station to the radio gateway 26. The radio gateway, in turn, generates an RRQ (registration request) message, indicated by the line 52 which is forwarded to the gatekeeper 34. A determination is made, responsive to detection of the request 52 as to whether to update the contents of the location register with the updated position of the mobile station. If the request is granted, the contents of the location register are updated and the gatekeeper returns an RCF (registration confirm-message) to the gateway 26. Thereby, the registry of the location register is updated, and a confirmation is provided to the gateway 26 that the location register has been updated. Thereafter, and as indicated by the segment 56, an indication is transmitted to the mobile station of the registration at the location register of the new, updated positional information.

Figure 2:
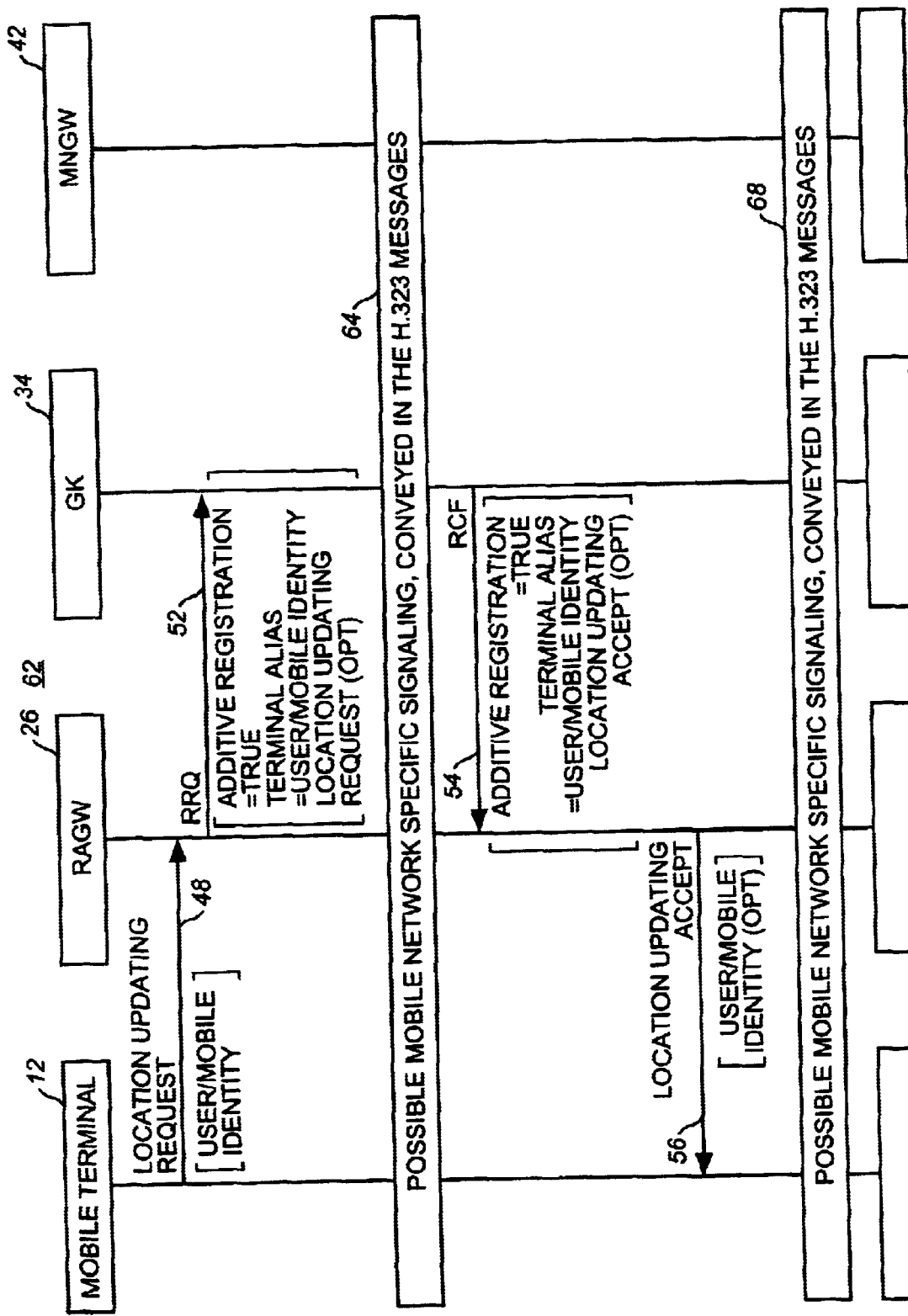
FIG. 2 illustrates a message sequence diagram showing the sequence of messages generated during operation of an embodiment of the present invention.

FIG. 2 illustrates a sequence diagram, shown generally at 62, illustrating the signaling during operation of an embodiment of the present invention between the mobile station 12, the gateway 26, the gatekeeper 34, and also the gateway 42. As noted previously, the mobile station 12 initiates the location updating procedure. In one implementation, and as described above, a location update is requested when the mobile station crosses a location area boundary from one cell to another cell. A location update request is also generated when the mobile station is initially powered-on. And, a location update request is generated at timed-intervals, such as when a timer times out at the mobile station.

For any of these reasons, a location update request 48 is generated by the mobile station and transmitted upon a radio-link to the radio gateway 26. The location update request includes user, or terminal identity information, and the radio gateway extracts such information from the message and forms an RRQ message 52 which is forwarded to the gatekeeper 34. The RRQ message includes an additive registration field which is set to a logical "TRUE" value, and also a terminal alias field in which the user terminal identity information is inserted. The RRQ message might also include an original message from the mobile station, or a corresponding mobile network message is included in the RRQ message.

The gatekeeper 34, if appropriate, informs the PLMN 38 by way of the mobile network gateway 42, of the location updating. Some PLMN-specific signaling occurs thereafter between the PLMN 38 and the mobile station 12. The signaling, represented by the block 64, is conveyed between the gateway 42, the gatekeeper 34, the relevant gateway 26, e.g., by way of RAS or Q.931 messages.

If no reason is found for rejecting updating of the location register, the gatekeeper sends an RCF message 54 to the gateway 26.

The RCF message 54 also includes an additive registration field which is set to a logical "TRUE" level and a terminal alias field includes the user or terminal identity inserted therein. Optionally, also a mobile network message also forms a portion of the RCF message to indicate the acceptance of the location updating. The user terminal identity contained in the RCF message need only be a temporary identity, and the temporary identity is changeable during the signaling between the mobile station and the PLMN 38. Thus, the identity of the mobile station in the RCF message may be different from the identity of the mobile station contained in the RRQ message 52 while still identifying the same mobile station. The identity of the mobile station in the RCF message 54 shall be registered as the identity of the mobile station at the gatekeeper 34. If a reason to reject the location updating, however, was found, the gatekeeper shall send an RRJ message (registration reject-message) to the radio gateway 26 which, in turn, informs the mobile station at the location updating request was rejected. Appropriate substitution of the signals 54 and 56 are substituted therefor in the Figure.

Additional exchange of some PLMN-specific messages between the mobile station and the PLMN represented by the block 68 in the Figure, is made subsequent to generation of the RCF message 54. Also, subsequent to registration of the updated position of the mobile station, the previous registration and location information of the mobile station is removed from the system.

While not separately illustrated, several radio gateways analogous to the gateways 16 and 26 may belong to the same location area, and the mobile station shall not initiate a new location update request if the location area does not change, even if the radio gateway with which the mobile station is attached changes. As a result, the gatekeeper 34 must page all of the radio gateways in the location area when a call to the mobile station is established so that the call can be directed to the correct radio gateway. For the same reason, the radio gateways do not keep a record of the mobile stations that have performed the location update request therethrough. Instead, the radio gateway should perform the paging procedure, when the gatekeeper informs the gateway that a call to a mobile terminal in the location area is being placed. As noted above, subsequent to updating of the updated positional information of the mobile station at the location register, the old location information must be removed from the system. In the scenario shown in FIGS. 1–2, the gatekeeper identifies the mobile station during the location updating and removes the location information.

Figure 3:
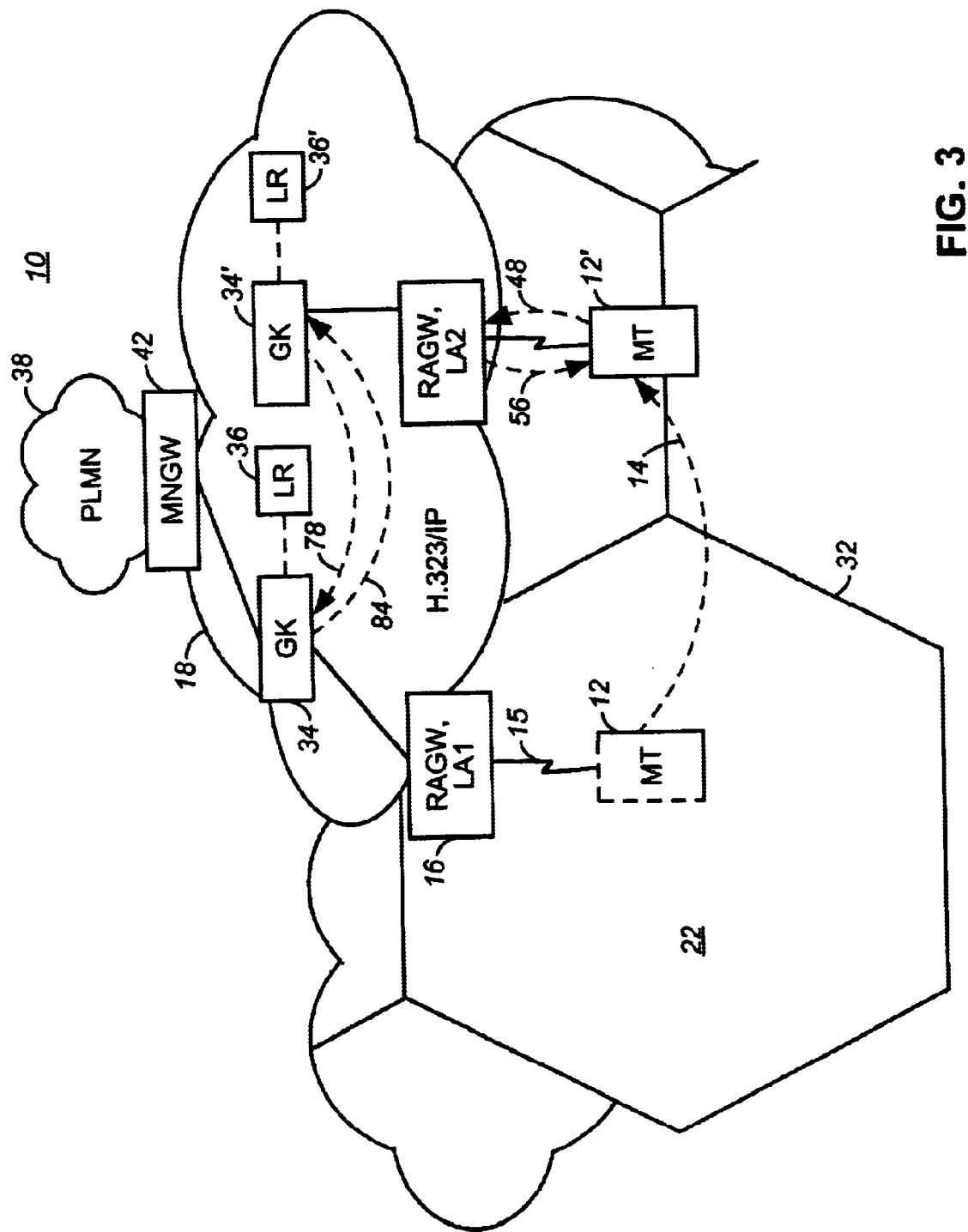
FIG. 3 illustrates a functional block diagram, similar to that shown in FIG. 1, also of a communication system in which an embodiment of the present invention is operable.

FIG. 3 again illustrates the communication system 10, generally corresponding to the communication system shown in FIG. 1. Elements shown previously in FIG. 1 are commonly-referenced in FIG. 3. Description of the functioning of such elements can be found in the above description of FIG. 1. The communication system 10 shown in FIG. 3 differs in functional construction with that of the communication system shown in FIG. 1 in that a first gatekeeper 34 is associated with the radio gateway 16, and a second gatekeeper 34' is associated with the gateway 26. The gatekeeper 34 is again associated with a location register 36. Here, though, a separate location register 36' is associated with the gatekeeper 34'.

When the mobile station initiates a location update request, again indicated by the segment 48, the request is transmitted to the radio gateway 26. The gateway 26, in turn, generates an RRQ message 52 which is forwarded to the gatekeeper 34' associated with the gateway 26. If a determination is made that the location register should be updated with updated positional information of the mobile station, the gatekeeper causes effectuation of such updating with the location register 36' associated therewith. An RCF message 54 is returned to the radio gateway 26 and, thereafter, a confirmation indication 56 is provided to the mobile station.

Here, the old position information associated with the mobile station is not stored at the location register 36', and the gatekeeper 34' is not able directly to remove the old location information. Instead, to remove the old information, the gatekeeper 34' must inform the gatekeeper 34 of the updating of the positional information of the mobile station at the location register 36'. The segment 78 represents the forwarding of such an indication by the gatekeeper 34' to the gatekeeper 34. The gatekeeper 34 thereafter removes the old locational information of the mobile station from the location register 36.

Figure 4B:
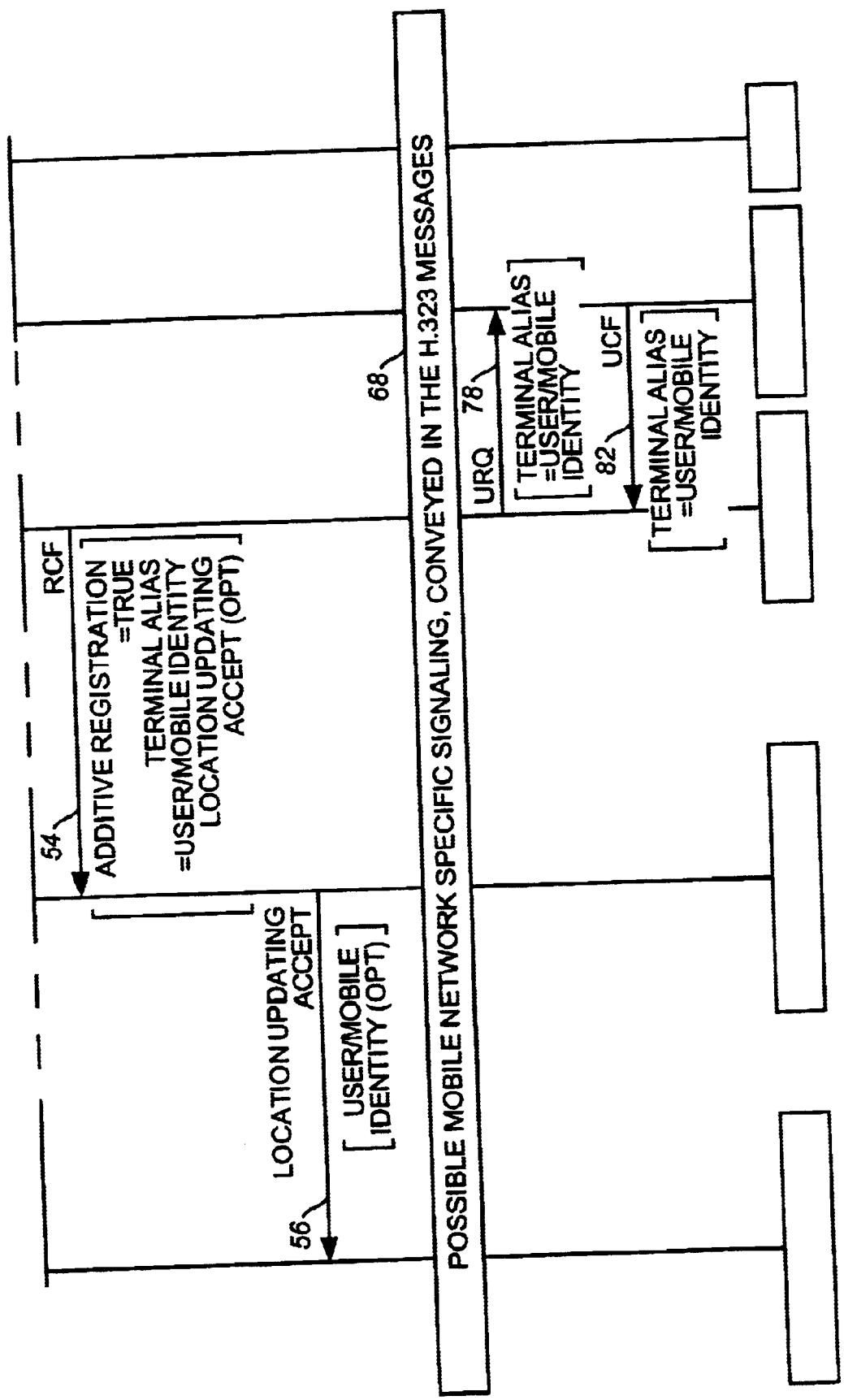
FIG. 4 illustrates a message sequence diagram showing the sequence of messages generated during a further embodiment of the present invention.

FIG. 4 illustrates a message sequence diagram 82 representative of operation of an embodiment of the present invention to update the contents of a location register with updated positional information of the mobile station.

The top portion of the message sequence 82 corresponds with the message sequence 62 shown in FIG. 2 and shall not be again described. Namely, the messages 48, 52, 64, 54, 56, and 68 correspond to the message sequence described with respect to FIG. 2.

Here, however, because different gatekeepers are associated with a source gateway 16 and a target gateway 26, additional signaling is required for the gatekeeper 34' to inform the gatekeeper 34 of the register update. The message sequence is here shown further to include the message 78 which is forwarded from the gatekeeper 34' to the gatekeeper 34. The message is here represented to be a URQ-message (unregistration request-message). The gatekeeper effectuates the removal of the old location information and returns a message 82, here a UCF-message (unregistration confirm-message) to the gatekeeper 34'.

The gatekeeper 34' must store the user/terminal identity that the mobile station sends through the radio gateway 26 in the request 48 of an RRQ-message 52. Such identity must be stored as the identity may change during the location updating, and the old identity must be used to indicate the correct mobile station to the gatekeeper 34.

Figure 5:
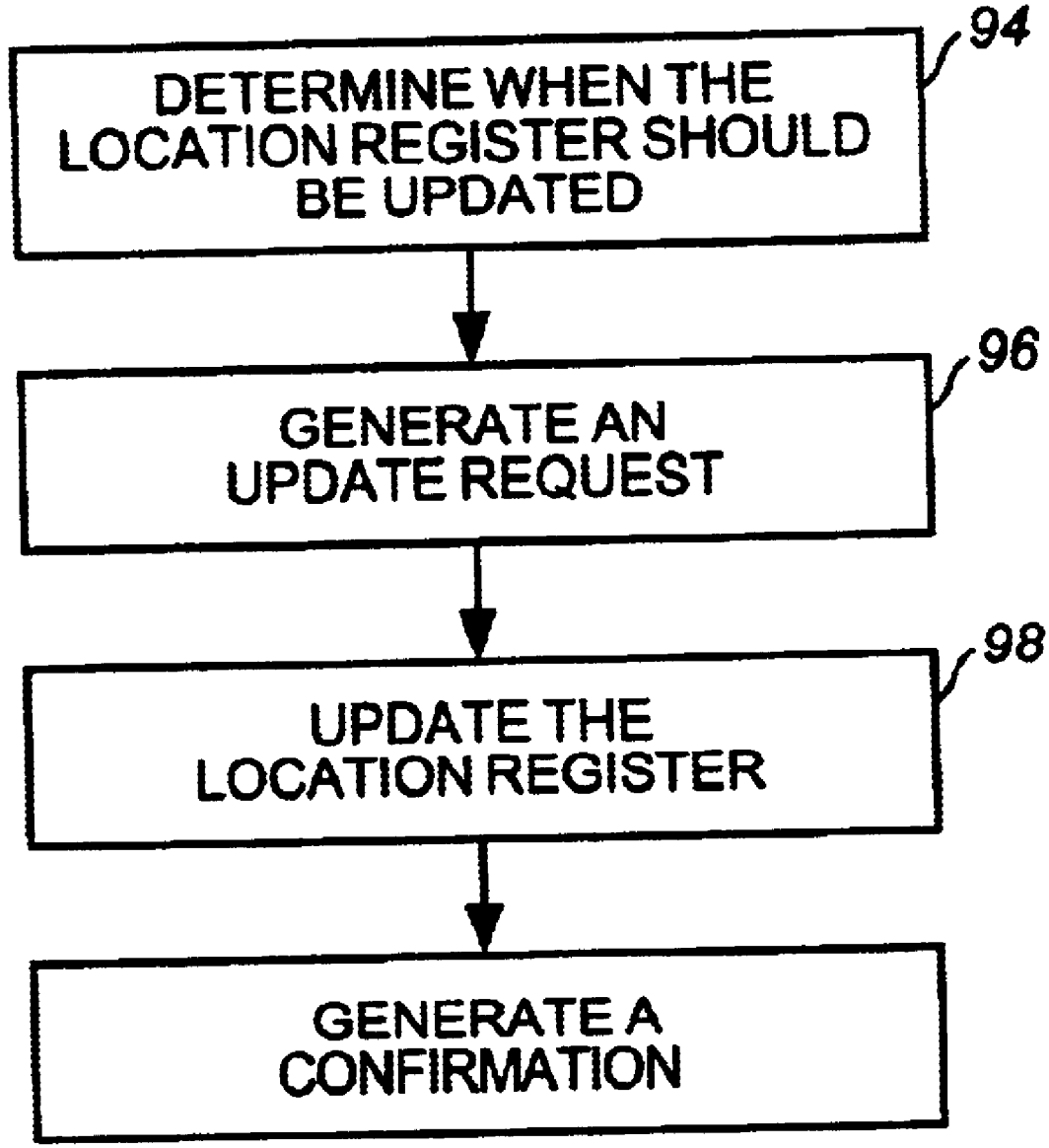
FIG. 5 illustrates a method flow diagram listing the method of operation of an embodiment of the present invention.

FIG. 5 illustrates a method, shown generally at 92, of an embodiment of the present invention. The method updates a location register with an updated position of a mobile station, such as when the mobile station moves from a first location area to a second location area.

First, and as indicated by the block 94, a determination is made when the updated position of the mobile station should be updated at the location register. Then, and as indicated by the block 96, a request to update the location register with the updated position of the mobile station is generated.

Then, and as indicated by the block 98, the location register is updated with the updated position of the mobile station. And, as indicated by the block 100, the updating of the location register with the updated position is confirmed.

Thereby, a manner is provided by which to improve mobile station mobility in an H.323-based, or other RTP-based radio communication system. Improved communication performance of the communication system is thereby operable through operation of an embodiment of the present invention.

The previous descriptions are of preferred examples for implementing the invention, and the scope of the invention should not necessarily be limited by this description. The scope of the present invention is defined by the following claims:

I claim:

1. A method for updating a location register with an updated position of a mobile station operable in a packet radio communication system operable to communicate real-time-protocol-formatted data, the packet radio communication system defining a first location area formed of a first set of cells and at least a second location area formed of at least a second set of cells the first and at least second location areas, respectively, separated by a location boundary, said method comprising:

determining in the mobile station when a request to update the location register should be initiated;

generating an RAS-protocol (registration admission status-protocol-formatted) request to update the location register with the updated position of the mobile station responsive to a determination made during said operation of determining that the request to update should be initiated;

determining whether to grant the update request;

selectably updating the location register with the updated position of the mobile station responsive to the RAS-protocol-formatted request generated during said operation of generating; and confirming, the updating of the location register, with an RAS-protocol-formatted confirmation message, if the location register is updated.

2. The method of claim 1 comprising the additional operation of removing a prior-registered position of the mobile station subsequent to the updating of the location register with the updated position of the mobile station.

3. The method of claim 2 wherein the packet radio communication system further comprises a packet radio network backbone and at least a first gatekeeper associated with the first location area and the second location area, wherein the location register is associated with the first gatekeeper, and wherein both the prior-registered position of the mobile station and the updated position, updated during said operation of updating are stored at the location register associated with the first gatekeeper.

4. The method of claim 2, wherein the packet radio communication system further comprises a packet radio network backbone, a first gatekeeper associated with the first location area, a second gatekeeper associated with the second location area, wherein the location register comprises a first location register associated with the first gatekeeper and a second location register associated with the second location area, the prior-registered position of the mobile station stored at the first gatekeeper and the updated position, updated during said operation of updating, is stored at the second gatekeeper.

5. The method of claim 4 wherein said operation of removing the prior-registered position of the mobile station further comprises informing the first gatekeeper, with a RAS-protocol-formatted informing message, of the updating at the second location register associated with the second gatekeeper of the position of the mobile station and removing the prior-registered position of the mobile station from the first location register.

6. The method of claim 1 wherein said operation of determining when to initiate an update request comprises determining when the mobile station crosses the location boundary.

7. The method of claim 1, wherein said operation of determining when to initiate an update request comprises determining when the mobile station is initially powered-on.

8. The method of claim 1 wherein said operation of determining when to initiate an update request comprises timing time periods subsequent to a prior updating of the location register with the position of the mobile station and determining whether the time period exceeds a selected threshold.

9. The method of claim 1 wherein the RAS-message of which the request is comprised comprises an RRQ (registration request) message.

10. The method of claim 9 wherein the RRQ message generated during said operation of generating the request is initiated by the mobile station, and wherein the RRQ message is generated by a radio gateway in operative association with the mobile station to a gatekeeper associated with the radio gateway.

11. The method of claim 10 wherein said operation of confirming with the RAS-protocol-formatted confirmation message comprises returning an RAS-protocol message to the gatekeeper.

12. The method of claim 11 wherein said operation of confirming further comprises sending a location auditing accept from the gatekeeper to the mobile station.

13. The method of claim 11 wherein the RAS-protocol message comprises an RCF (registration confirm) message.

14. The method of claim 13 wherein the RCF message includes an identity alias field for identifying the mobile station and wherein the mobile station is identified in the identity alias field with a temporary identifier.

15. The method of claim 1 wherein frame-formatted data, formatted pursuant to an H.323 protocol is communicated during operation of the packet radio communication system and wherein the request generated during said operation of generating comprises an H.323 protocol-formatted message.

16. The method of claim 15 wherein said operation of confirming comprises generating an H.323 protocol-message.

17. In a packet radio communication system operable to communicate real-time-protocol-formatted data and in which a first location area formed of a first set of cells and at least a second location area formed of at least a second set of cells are defined, the first and second location areas, respectively, separated by a location boundary and a mobile station operable to communicate in the communication system, an improvement of an assembly for updating a location register with an updated position of the mobile station, said assembly comprising:

a location register update request detector coupled to receive indications of a RAS-protocol-formatted (registration admission status-protocol-formatted) request to update the location register with the updated position of the mobile station;

a location-register updated request generator coupled to said location register request detector, said location-register update request generator for generating a RAS-protocol update request for initiating a determination of whether to grant the request and update updating the location register with the updated position of the mobile station.

18. The assemble of claim 17 wherein the packet radio communication system comprises a packet network and at least a first gatekeeper and wherein said location register update request detector and said location-register update request generator are located at the gatekeeper.

19. The assembly of claim 18 further comprising a registration-update confirmation generator located at the gatekeeper, said registration-update confirmation generator for generating an RAS-protocol-formatted confirmation message confirming updating of the location register if the request is granted.

* * * * *